July 13, 1954  E. G. KELLER  2,683,560
METHOD AND APPARATUS FOR DELIDDING BAKING PANS
Filed Nov. 27, 1951  7 Sheets-Sheet 1
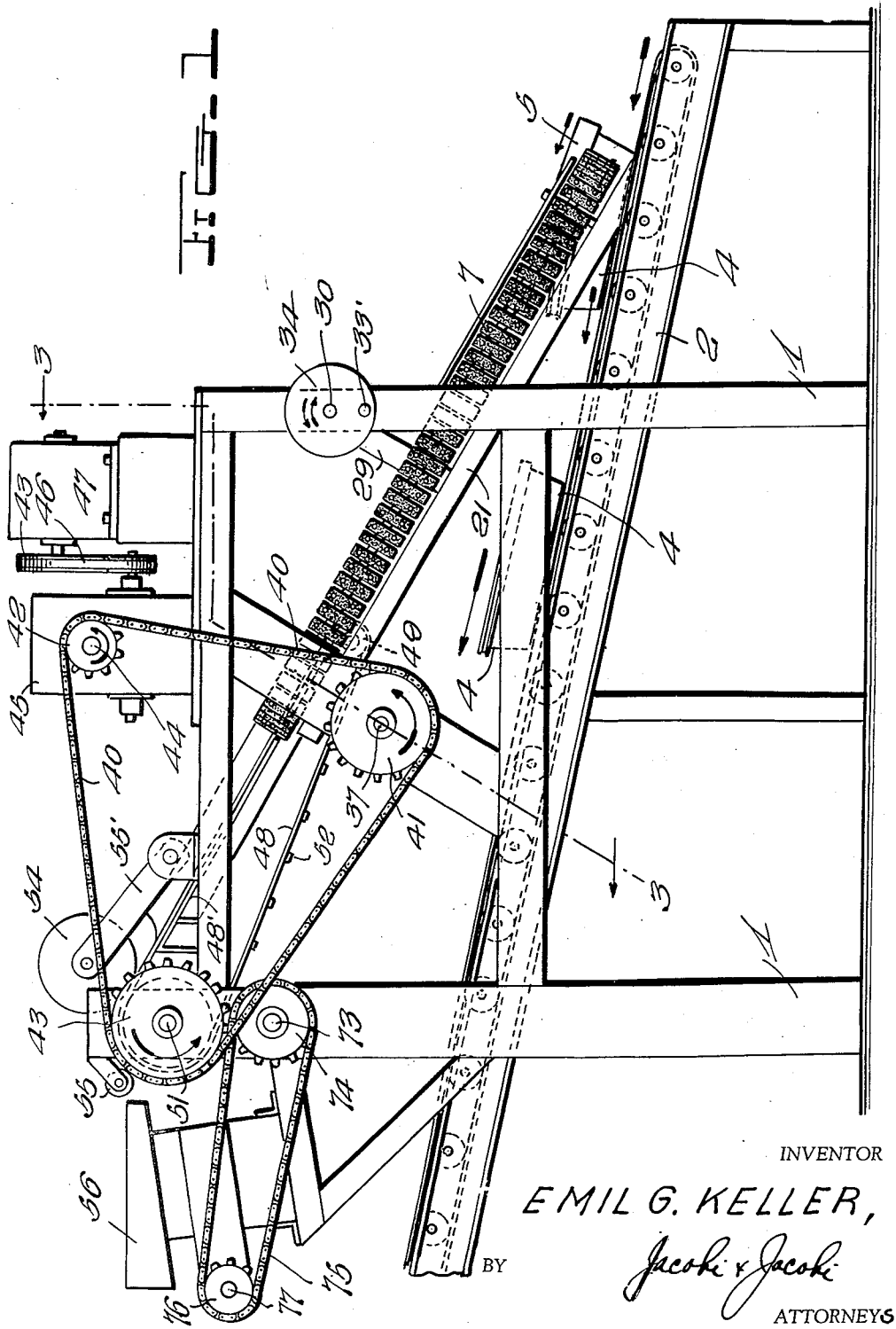
INVENTOR
EMIL G. KELLER,
BY Jacobi & Jacobi
ATTORNEYS July 13, 1954 E. G. KELLER 2,683,560
METHOD AND APPARATUS FOR DELIDDING BAKING PANS
Filed Nov. 27, 1951 7 Sheets-Sheet 2
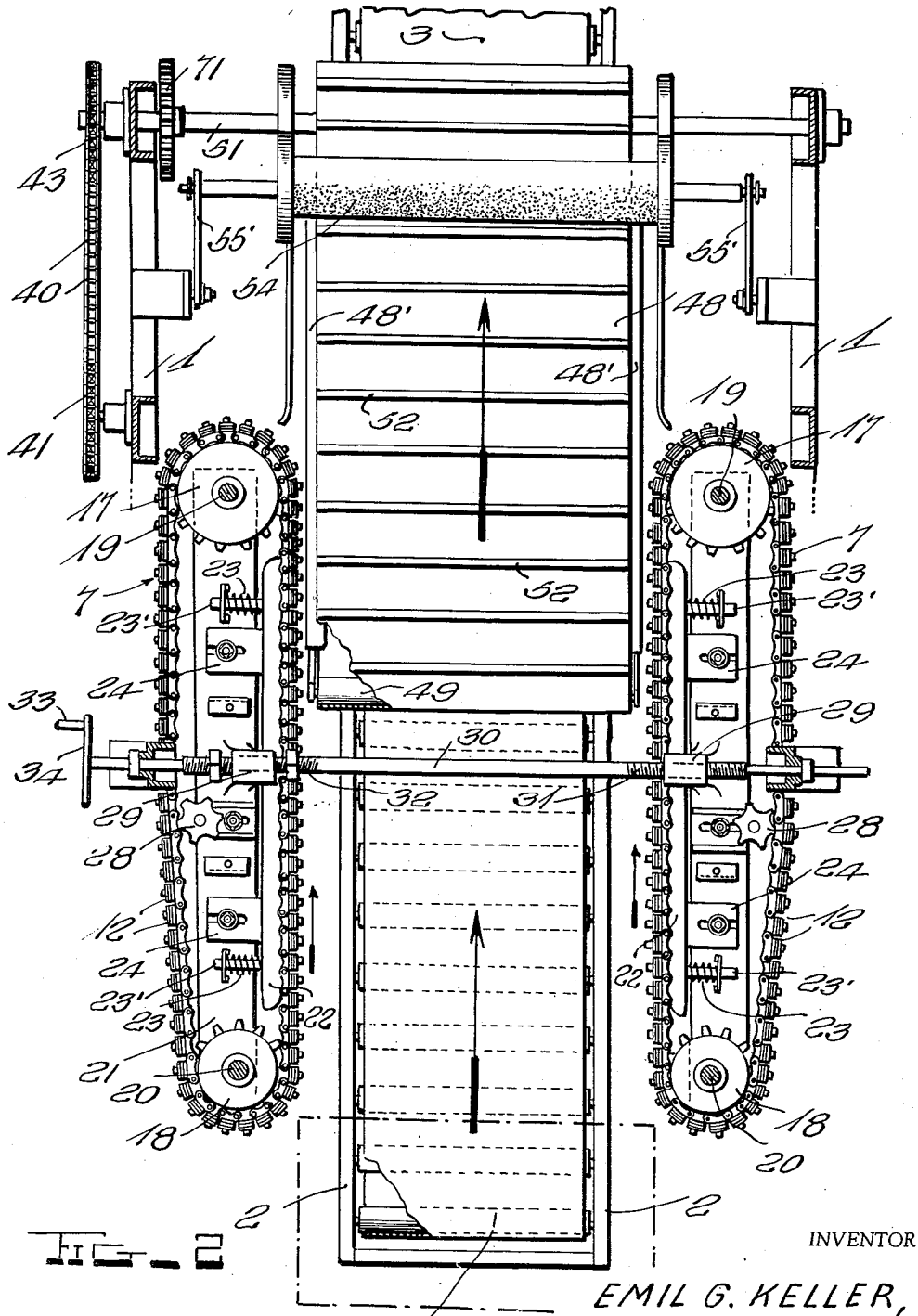
FIG_2
INVENTOR
EMIL G. KELLER,
BY
ATTORNEYS

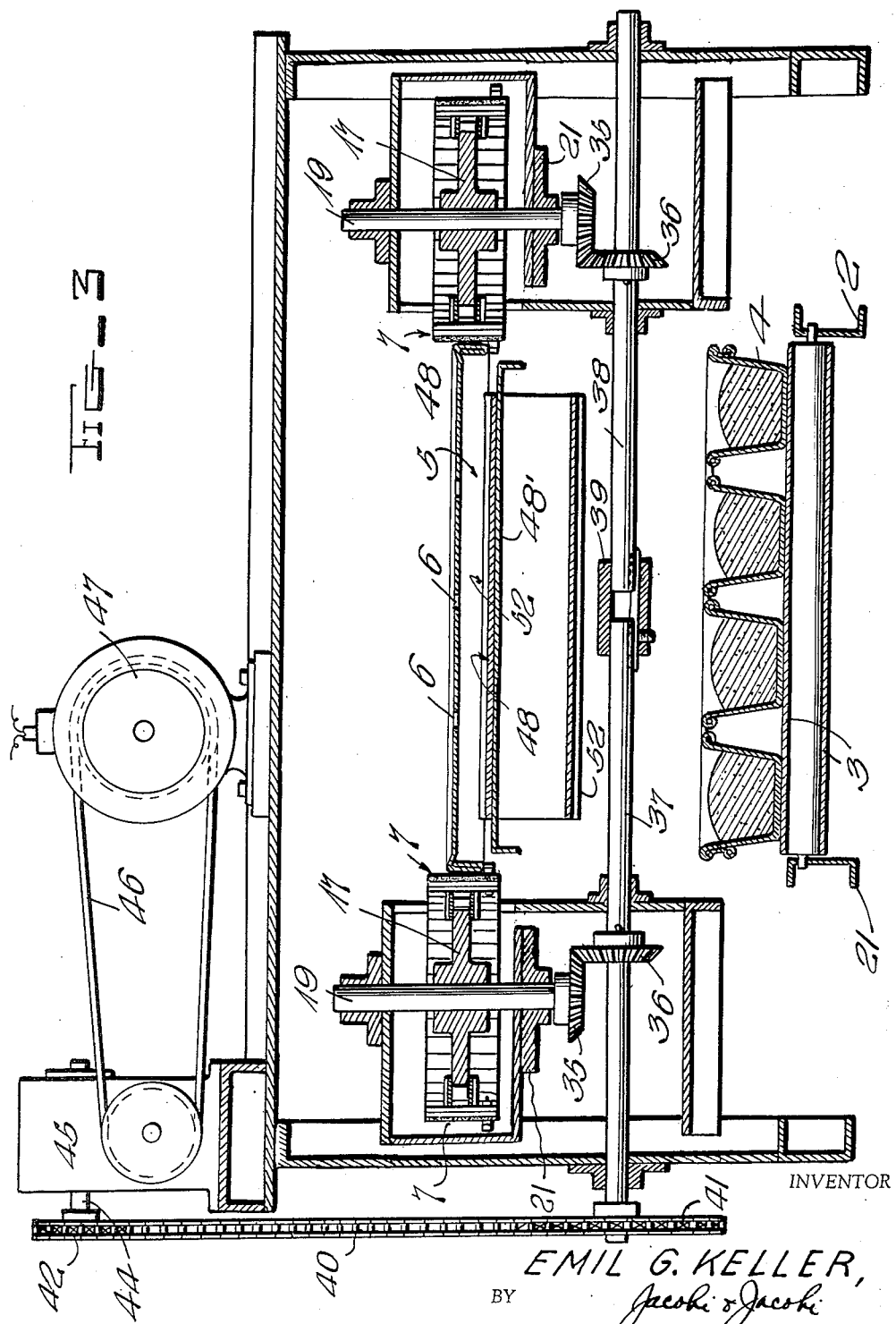

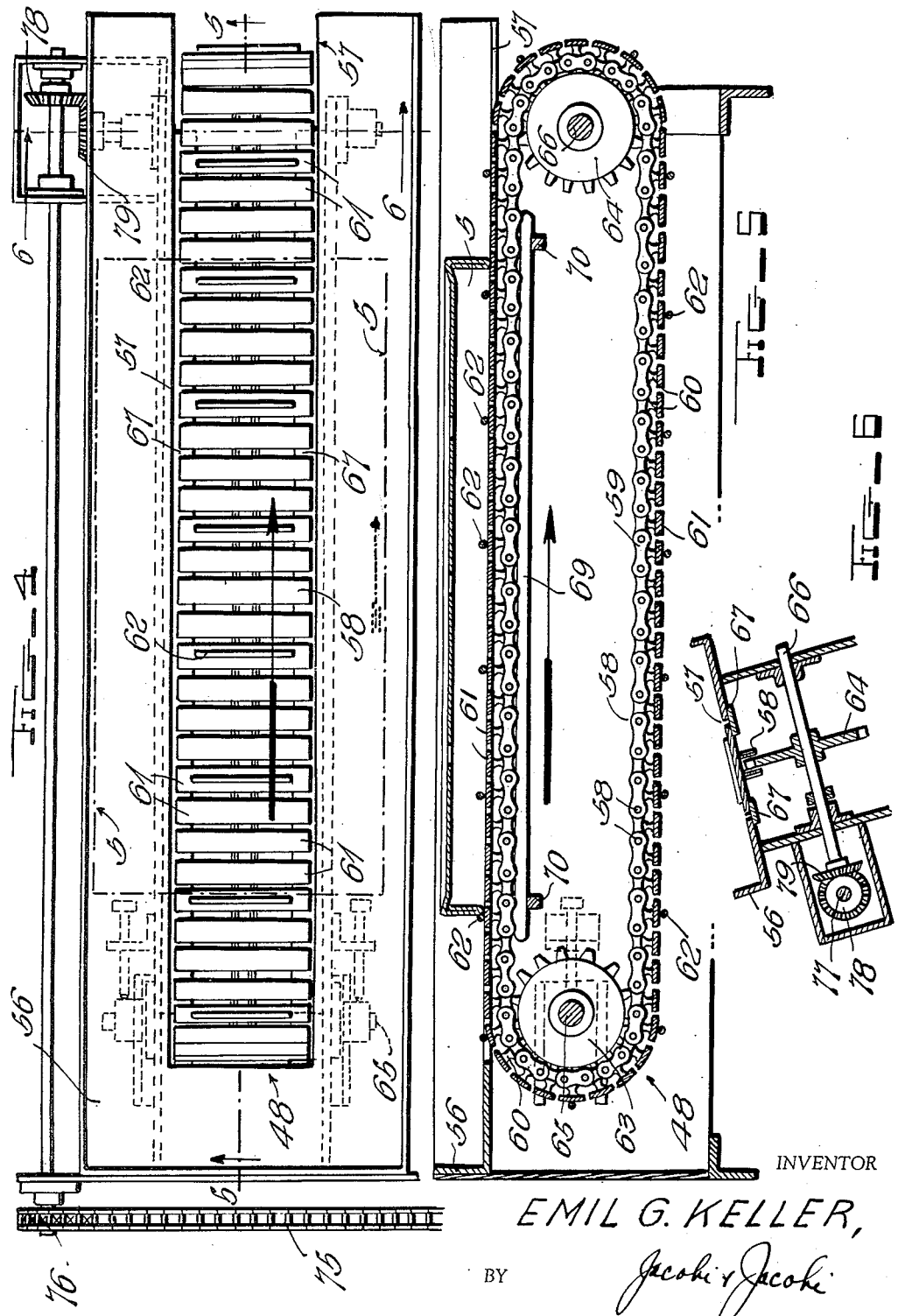

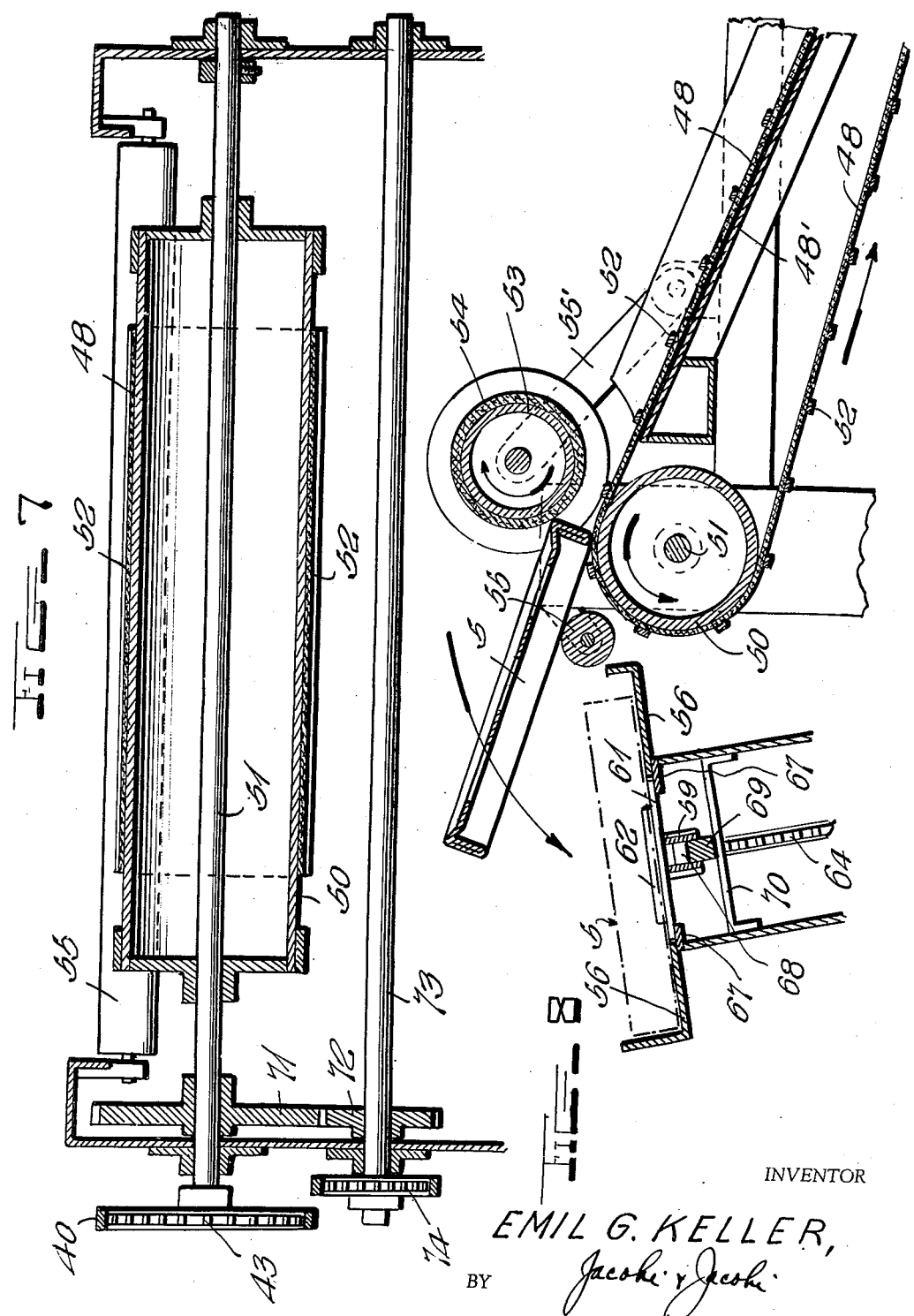

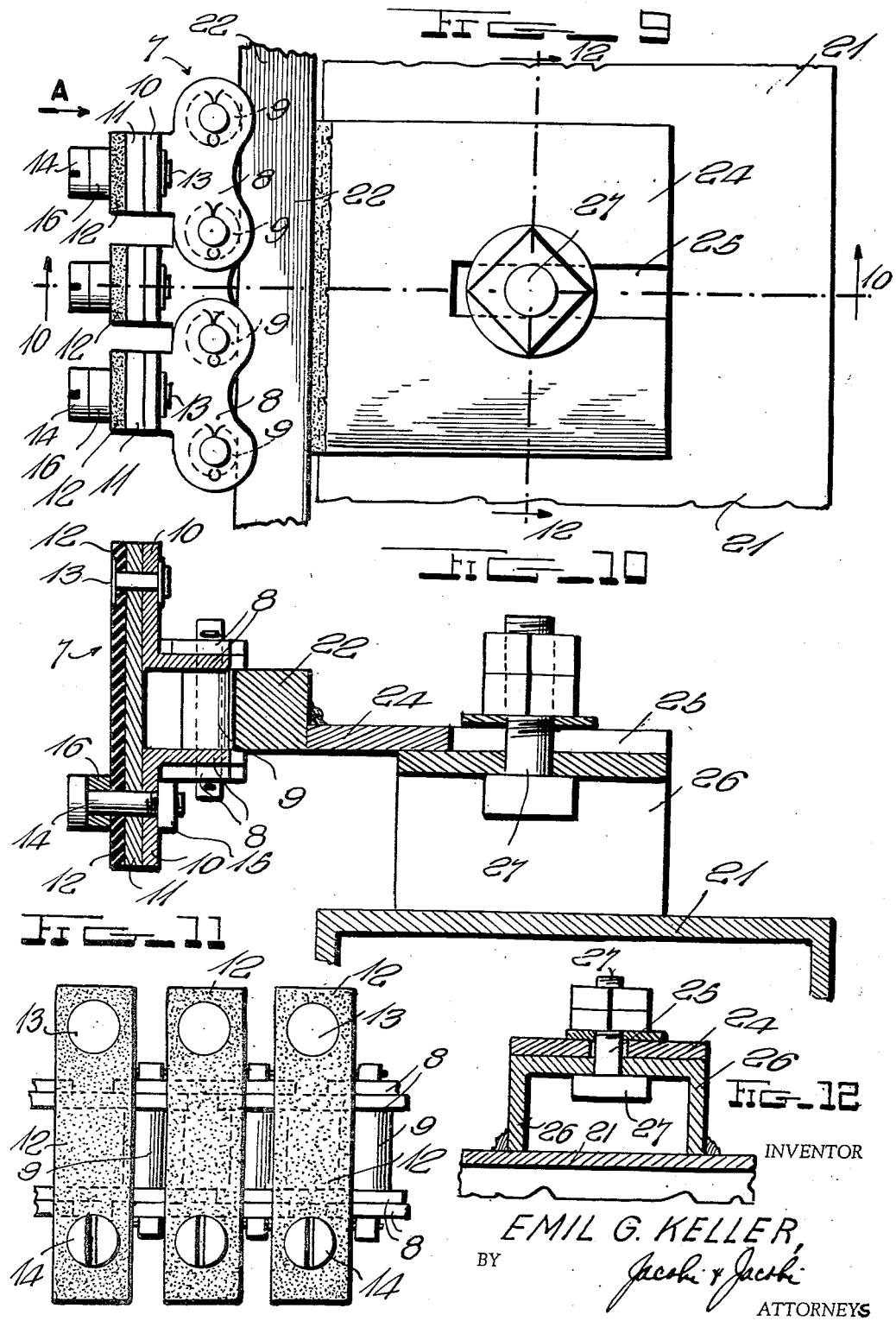

July 13, 1954 E. G. KELLER 2,683,560
METHOD AND APPARATUS FOR DELIDDING BAKING PANS
Filed Nov. 27, 1951 7 Sheets-Sheet 7
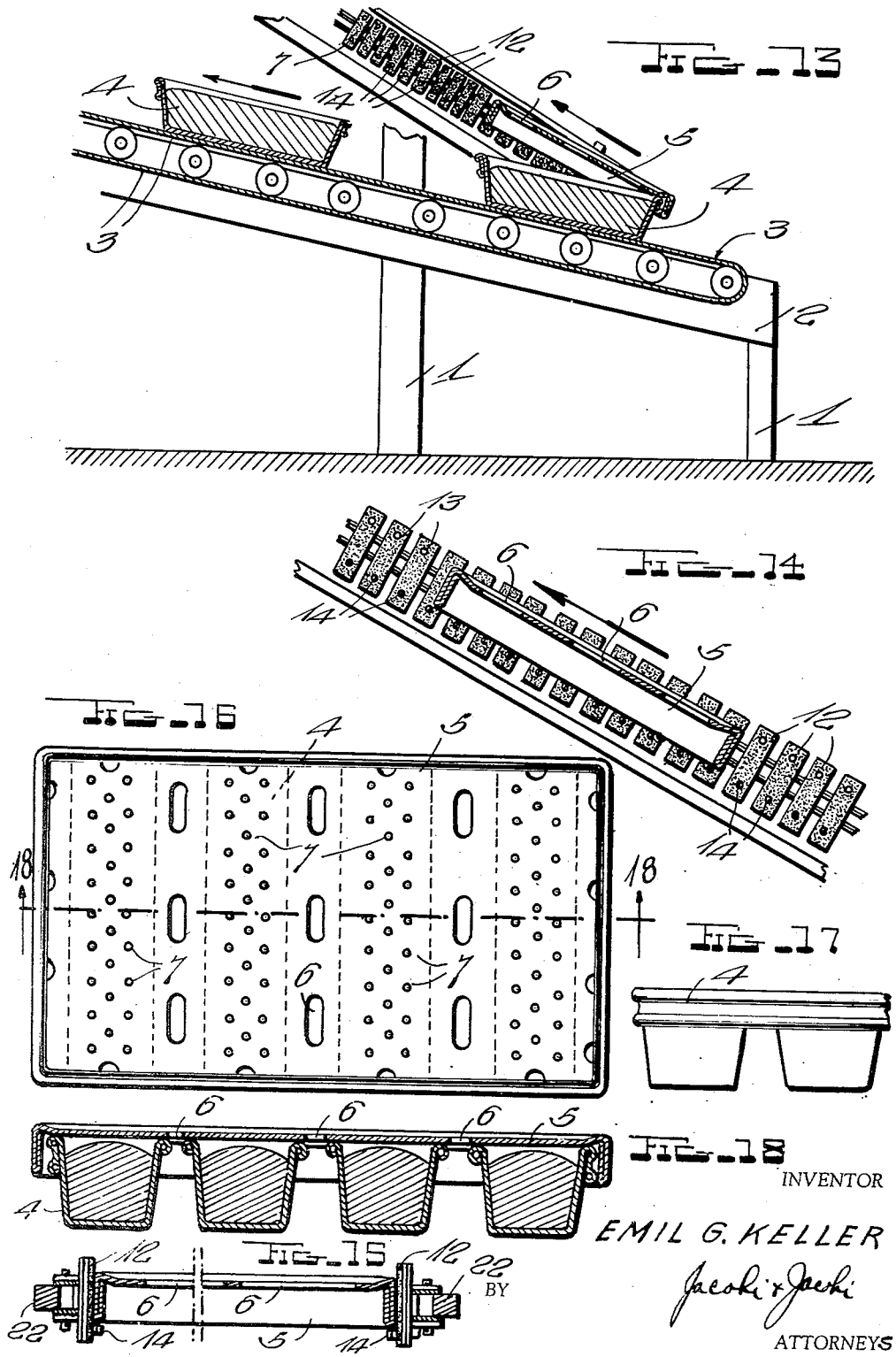
INVENTOR
EMIL G. KELLER
BY Jacobi & Jacobi
ATTORNEYS Patented July 13, 1954

2,683,560

UNITED STATES PATENT OFFICE 2,683,560

METHOD AND APPARATUS FOR DELIDDING BAKING PANS

Emil G. Keller, Harrisburg, Pa., assignor to Stroehmann Brothers Company, Williamsport, Pa., a corporation of Pennsylvania Application November 27, 1951, Serial No. 258,456

10 Claims. (Cl. 226—129)

My invention relates to new and useful improvements in the art of baking and more particularly to the baking of bread and the primary object of the invention is to provide a new and improved method and apparatus for the removal of the lids from bake pans, as the latter are withdrawn with the baked product therein from the oven.

A further object of the invention resides in providing an improved means and apparatus for automatically removing the lids from the bake pans as the latter are conveyed from the oven to the depanning apparatus.

A still further object of the invention resides in providing a pan conveyor with means operating at an angle thereto for automatically removing the lids from the pans as the latter are moved on said conveyor.

Still another object of the invention resides in the provision of an improved lid gripping and conveying means operating on opposite sides of and at an acute angle to a pan conveyor to automatically remove the lids from the pans as the latter are moved on said conveyor.

A still further object of the invention resides in the provision of a pair of lid-gripping conveyor elements operating at an acute angle to a pan conveyor whereby the lids on the pans may be automatically removed as said pans are moved on said conveyor.

Still another object of the invention resides in provision of an improved means for conveying and discharging the lids which have been automatically removed from the bake pans.

A still further object of the invention resides in the provision of an improved lid gripping apparatus, capable of lateral adjustment to accommodate lids of varying widths.

A further object of the invention resides in the provision of a device of the class described which is comparatively simple and durable in construction, inexpensive to manufacture and one which will be very efficient and useful in operation.

With these and numerous other objects in view, my invention consists in the novel features of construction, combination and arrangement of parts as will be hereinafter referred to and more particularly pointed out in the specification and claims.

In the accompanying drawings, forming a part of this application:

Figure 1 is a side elevation of the machine showing the apparatus for removing the lids of bake pans which are being carried from an oven on a conveyor, one pan being shown delidded and the other about to be delidded;

Figure 2 is a top plan view of the machine, with parts broken away and parts omitted, illustrating clearly the lid removing belts and the relation thereof to the pan carrying conveyor;

Figure 3 is an enlarged transverse vertical section, taken substantially on the line 3—3 of Figure 1, showing a pan of bread on a conveyor with a lid held thereabove between the lid removing belts;

Figure 4 is a plan view of the conveyor which removes the lids after same have been discharged or released from the delidding apparatus;

Figure 5 is a longitudinal section taken substantially on the line 5—5 of Figure 4;

Figure 6 is a vertical transverse section taken substantially on the line 6—6 of Figure 4;

Figure 7 is an enlarged vertical transverse section through one end of the conveyor for the lids;

Figure 8 is a fragmentary longitudinal section through the lid conveyor showing a lid about to be discharged therefrom onto the trough of the second lid conveyor shown in Figures 4 and 5 of the drawings;

Figure 9 is an enlarged fragmentary plan view showing a detail of construction of the lid gripping and removing belt with the adjustment for the track therefor;

Figure 10 is a vertical section therethrough as seen on the line 10—10 of Figure 9;

Figure 11 is an enlarged fragmentary elevation of one of the lid gripping belts;

Figure 12 is a vertical section as seen in the line 12—12 of Figure 9, looking in the direction of the arrows;

Figure 13 is a fragmentary vertical section taken longitudinally through the apparatus and showing particularly the relationship in diagram between the bake pan conveyor and the apparatus for removing the lids of the pans, there being illustrated a lid as it is being removed from one of the pans on the conveyor;

Figure 14 is a fragmentary enlarged vertical section showing particularly the relationship of a lid to the elements of one of the lid removing belts;

Figure 15 is a transverse vertical section taken through the lid removing belts showing the relationship of a lid to said belts in such operation;

Figure 16 is a top plan view of one of the lids on a bake pan;

Figure 17 is a fragmentary side elevation of one of the pans with the lid removed and Figure 18 is a vertical section as seen on the line 18—18 of Figure 16, showing the lid in relation to the pan for baking bread.

In the baking art, it is a known fact that certain types of bread are baked in pans with lids thereon and when the bread in such pans is removed from the oven, the lids are necessarily removed before the bread in the pans is directed to the depanning apparatus. The removal of the lids from the pans is usually accomplished manually, as a result of which there is a loss of time in the movement of the pans from the oven to the depanning apparatus, and, of course, an added expense.

There have been some attempts made to provide means for removing the lids from such pans automatically but the apparatus provided therefor has been costly to produce, has not proven to be a time and labor saver and otherwise has not proven successful. My invention contemplates the provision of a comparatively simple and effective means for automatically removing the lids from the pans as the latter, with the bread therein, is conveyed from the oven.

In describing the invention, I shall refer to the drawings in which similar reference characters designate corresponding parts throughout the several views and in which the numeral 1 designates a frame between the side walls of which is supported an additional frame 2, the latter supporting therein an endless conveyor belt 3. This conveyor belt 3 is formed preferably of asbestos and the frame supporting the same is positioned at one end thereof immediately adjacent an oven (not shown), so that bake pans, designated in the drawings by the numeral 4, when removed from said oven may be directed to said conveyor and transported to a depanning apparatus (not shown). As aforementioned, my invention is particularly designed to remove the lids from bake pans as the latter are carried on the aforesaid conveyor and the pans are shown in the drawings with lids 5 of conventional design and construction. The bake pan 4 is shown in the drawings as designed to contain four loaves of bread but, of course, the same may be of any size or contour, since this construction does not affect my particular invention. The lids 5 are provided with a plurality of elongated openings 6 and a multiplicity of small openings 7 for the escape of steam and vapors but this particular construction may be varied as it does not constitute any part of my specific invention, which is directed to the removal of these lids from the pans.

As shown in the drawings, particularly Figure 1 thereof, the endless conveyor 3 is directed upwardly from its forward to its rear end and as this portion of the apparatus forms no particular part of my invention I have not disclosed the structure onto which the pans are discharged from this conveyor. I provide an improved means for removing the lids from the pans as same are moved on the conveyor 3 and to this end I provide on each side of the conveyor 3, and within the confines of the frame 1, an endless lid gripping belt referred to generally by the numeral 7. These lid gripping belts extend from points just inside the forward end of the conveyor 3 to points just beyond the median line of the apparatus and said belts are inclined upwardly from the forward toward the rear ends thereof at an angle acute to the plane of the belt 3. This difference in angularity between the conveyor 3 and the lid removing belts 7 is best shown in Figures 1 and 13 of the drawings.

Thus, as the pans are conveyed on the endless conveyor 3 upwardly, the lids thereof are adapted to be engaged by the inner opposed surfaces of the belts 7 and lifted from the pans and carried to points different from the latter, as will be hereinafter and more particularly described.

The belts 7 are each constructed of a series of interengaging links 8 which support thereon the rollers 9. Each link is formed of an upper and lower portion with angular outer faces 10, the latter having secured to the outer faces thereof a metal plate 11 over the front of which is a strip of heat resisting material 12, such as "neoprene." The parts 10, 11 and 12 at the top of each link are riveted together as shown at 13, whereas these parts at the lower end of the link are bolted together by means of a bolt 14 and nut 15, the head of the bolt being spaced from the front face of the strip 12 by means of a spacer 16. Thus, each link is provided with a projection adjacent its lower end formed by the head of the bolt 14 and the spacer 16 and this projection affords a means upon which the lower edge of the lids 5 may rest as said lids are removed from the pans, as best shown in Figures 13 and 14 of the drawings.

These lid lifting belts 7 which have been heretofore described in detail are trained over pairs of upper sprockets 17 and lower sprockets 18, as best shown in Figure 1 of the drawings. The upper sprockets 17 are mounted on the shafts 19, while the lower sprockets 18 are mounted on shafts 20, said shafts 19 and 20 being supported on a bed plate 21, as best shown in Figures 2 and 3 of the drawings. These belts 7 and the elements supporting same are capable of being adjusted slightly with respect to one another, as will be hereinafter and more particularly set forth.

The inner opposed stretches of the belts 7 operate against tracks or the like 22 which contact with the rollers 9 as shown in Figure 10 of the drawings. These tracks are held in yielding contact with the rollers of the links of the belts 7 by means of the springs 23 supported on studs 23' carried by said tracks. It will thus be seen that these tracks are held in spring contact at all times with the inner faces of the inner opposed structures of said belts 7.

The tracks 22 are provided with angular guide strips 24, the strips being slotted as shown at 25 and held on the supports 26 by means of bolts 27. The supports 26 are mounted on the base plate 21, as best shown in Figures 10 and 12 of the drawings and through this medium the tracks 22 may be adjusted laterally with respect to the belts 7. A belt tightener 28 is also provided for each of the belts 7, as clearly shown in Figure 2 of the drawings.

These belts 7 are adjusted so as to be spaced from one another slightly less than the width of the lids with which the same are adapted to be engaged and thus through friction these belts will engage and grip the lids as the lidded pans are carried on the conveyor 3 and readily remove said lids in a manner, as shown in Figures 13 and 14 of the drawings.

I have also provided an adjustment for spacing the belts 7 in accordance with varying sizes of lids. To this end, a pair of sleeves 29 is provided, the same being mounted on the respective base plates 21 and a shaft 30 extends transversely of the machine having right and left threads as shown at 31 and 32 operating respectively in right and left threaded bores of the sleeves 29.

A handle 33 is mounted on the end of the shaft 30 through the medium of a disc 34 and thus it will be seen that the two belts 7 supported respectively on the base plates 21 may be adjusted laterally with respect to one another.

The upper shafts 19 carrying the sprockets 17 have mounted at the lower ends thereof the bevel gears 35 which mesh with bevel gears 36 carried, respectively, on sections 37 and 38 of a split shaft. The sections of this split shaft are connected together through the medium of a sleeve 39 which is keyed to said sections, the key being locked in position by means of a set screw.

It will be seen that an adjustment of these sections of the split shaft is necessary when the belts 7 are to be adjusted laterally with respect to one another. The split shaft formed of the sections 37 and 38 receives its power from a chain 40 trained over a gear 41 mounted at the end of the section 37 of said split shaft. This chain 40 is trained over a gear 42 and also over a gear 43. The gear 42 is mounted on a shaft 44 projecting from a speed reducer 45, the latter being connected through a drive belt 46 to the motor 47. Thus it will be seen that power is properly transmitted to the split-driven shaft and in turn to the lid lifting belts 7.

As the lids 5 of the bake pans are removed from the pans and carried upwardly on a plane at a different angle from the plane of movement of the pans, they are carried to the end of the belts 7 where they are discharged upon a lid carrying conveyor 48 which is supported within the framework of the machine and extends substantially at the same angle upwardly as the belts 7. The upper stretch of this conveyor 48 moves on the bed plate 48', as best shown in Figure 8. This conveyor 48 is formed preferably of woven cotton canvas or similar material and its lower end is trained over an idle roller 49 while the upper end thereof is trained over a roller 50 carried on a shaft 51 which also carries at the end thereof the gear 43, heretofore referred to. Secured to the outer face of the conveyor 48 and extending transversely thereof are the woven cotton canvas strips or cleats 52 which are adapted to contact the lower edges of the lids 5 and carry the latter upwardly as said lids are discharged on the conveyor 48, while the latter is being actuated.

I have provided a means to retain the lids on the conveyor 48 and assist in the release of the same therefrom. To this end, I provide a hollow metal roller 53, the outer face of which is covered with woven cotton canvas or similar material, as shown at 54. This roller is rotatably supported between the pivoted arms 55', carried on the frame of the machine and the roller is obviously contacted as each lid is brought to the upper rear end of the conveyor 48. When the lid is brought in contact with the roller 53, it necessarily lifts said roller as said lids are forced between the rollers 50 and 53 and as the lids are moved onward through said rollers, the lower edges of said lids contact an idler 55 supported on the frame just beyond the rollers 50 and 53, as best shown in Figure 8 of the drawings. In said Figure 8, there is shown a lid being discharged from the conveyor 48 after having been drawn through the rollers 50 and 53. It will be seen that substantially two-thirds of the length of the lid 5 extends beyond the idler 55 before said lid is, by its own weight, dropped onto a trough 56. From this trough, the lids are adapted to be conveyed, through the medium of a special conveying means to be hereinafter and more particularly set forth, to a remote location for reuse on bake pans.

The trough 56 at the end on which the lids 5 are discharged is closed, as shown in Figures 1 and 4 of the drawings, and the opposite end thereof is open to allow said lids, as same are conveyed through the trough, to be discharged therefrom. The trough 56 is slotted from the open end thereof to a point adjacent the closed end, said slot being designated by the numeral 57, and best shown in Figures 4 and 5 of the drawings. Mounted just below the trough 56 and arranged to project through the slot 57 thereof is another conveyor which is generally designated by the numeral 58. One stretch of the endless conveyor 58 at all times extends through the slot 57 of the trough and constitutes a movable flooring for the latter. This endless conveyor 58 comprises a series of interlocking links 59, having the outstanding projections 60 formed thereon or secured thereto and mounted on the ends of said projections 60 are the slats or the like 61. On various slats facing outwardly there are mounted gripping ribs or cleats 62, so that the lids 5 when moved onto the trough 56 may be engaged as the endless conveyor is rotated to carry said lids toward the open end of the trough. The engagement of one of the lids with a rib or cleat 62 is illustrated in Figure 5 of the drawings. This endless conveyor 58 operates over sprocket wheels 63 and 64, which are respectively carried on the shafts 65 and 66, said shafts being mounted within a framework just below the trough 56.

In order to properly support the slats 61 of the endless conveyor 58 as the latter is operated through the slot of the trough, I provide the flanges 67 on the base of the trough projecting into the slot 57 from both sides thereof, as best seen in Figure 6 of the drawings. Thus, it will be seen that the ends of the slats will have a support throughout the length of the trough as the conveyor 58 is actuated.

The links 59 of this endless conveyor 58 are substantially the same as the links 8 heretofore described and same are provided with rollers 68, similar to the rollers 9 of the links 8, as best seen in Figure 8. In order to prevent sagging of the links of this conveyor 58, I provide a longitudinal supporting bar or track 69, upon which the rollers 68 ride as the conveyor 58 is actuated. This track or supporting bar 69 is supported in position by means of the transverse supports or brackets 70, as clearly shown in Figures 5 and 8 of the drawings.

In order to develop power for this conveyor 58, I provide on the shaft 51 a large gear 71, which meshes with a smaller gear 72 carried on a transversely supported shaft 73, mounted within the frame of the device, as shown in Figure 7 of the drawings. At the one end of the shaft 73, there is mounted a sprocket 74 over which is trained a chain 75. This chain 75 also extends over a smaller sprocket 76 which is carried at one end of a driven shaft 77, extending longitudinally of the trough 56 just outside of the latter, as best shown in Figure 4 of the drawings. This shaft 77 is supported on suitable brackets and adjacent the opposite end thereof is mounted a bevel gear 78, which co-acts with a bevel gear 79 carried on one end of the shaft 66, as clearly shown in Figures 4 and 6 of the drawings. Thus, it will be seen that when the lid lifting and removing elements are in operation, the conveyor 58 will also be in operation. The lids will be conveyed on this conveyor 58 to a remote location where same may again be used on baking pans.

While I have not described, nor shown, any particular source of power for the endless conveyor 3, which carries the pans from the oven, it will be understood that any source of power may be utilized, it being understood, however, that the movement of said conveyor 3 will be synchronized with the movement of the lid-removing belts 7.

From the foregoing description of the construction of my improved delidding apparatus, the method of assembly and the application thereof to use will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described my invention, what I claim is:

1. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including pivotally connected links, each link having an elongated yieldable friction face disposed at substantially right angles to the plane of movement of said endless conveyers, a projection adjacent the lower end of each friction face, yieldable backing means for the inner run of each endless conveyer and means for adjusting the spacing between said endless conveyers whereby lids on bake pans carried by said bake pan conveyer means may move between said endless conveyers with said friction faces in tight gripping engagement with the edges of said lids and with said projection extending beneath the edges of said lids, the inclination of said endless conveyers relative to said bake pan conveyer means causing separation of said lids from said pans as said lids and pans advance, a discharge conveyer for receiving lids from said endless conveyers and means for maintaining said lids in upright position upon delivery from said discharge conveyer.

2. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including pivotally connected links, each link having an elongated yieldable friction face disposed at substantially right angles to the plane of movement of said endless conveyers, a projection adjacent the lower end of each friction face and yieldable backing means for the inner run of each endless conveyer whereby lids on bake pans carried by said bake pan conveyer means may move between said endless conveyers with said friction faces in tight gripping engagement with the edges of said lids and with said projection extending beneath the edges of said lids, the inclination of said endless conveyers relative to said bake pan conveyer means causing separation of said lids from said pans as said lids and pans advance, a discharge conveyer for receiving lids from said endless conveyers and means for maintaining said lids in upright position upon delivery from said discharge conveyer.

3. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including pivotally connected links, each link having an elongated yieldable friction face disposed at substantially right angles to the plane of movement of said endless conveyers and yieldable backing means for the inner run of each endless conveyer whereby lids on bake pans carried by said bake pan conveyer means may move between said endless conveyers with said friction faces in tight gripping engagement with the edges of said lids, the inclination of said endless conveyers relative to said bake pan conveyer means causing separation of said lids from said pans as said lids and pans advance, a discharge conveyer for receiving lids from said endless conveyers and means for maintaining said lids in upright position upon delivery from said discharge conveyer.

4. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including pivotally connected links, each link having an elongated yieldable friction face disposed at substantially right angles to the plane of movement of said endless conveyers, a projection adjacent the lower end of each friction face, yieldable backing means for the inner run of each endless conveyer and means for adjusting the spacing between said endless conveyers whereby lids on bake pans carried by said bake pan conveyer means may move between said endless conveyers with said friction faces in tight gripping engagement with the edges of said lids and with said projection extending beneath the edges of said lids, the inclination of said endless conveyers relative to said bake pan conveyer means causing separation of said lids from said pans as said lids and pans advance and a discharge conveyer for receiving lids from said endless conveyers.

5. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including pivotally connected links, each link having an elongated yieldable friction face disposed at substantially right angles to the plane of movement of said endless conveyers, a projection adjacent the lower end of each friction face, yieldable backing means for the inner run of each endless conveyer and means for adjusting the spacing between said endless conveyers whereby lids on bake pans carried by said bake pan conveyer means may move between said endless conveyers with said friction faces in tight gripping engagement with the edges of said lids and with said projection extending beneath the edges of said lids, the inclination of said endless conveyers relative to said bake pan conveyer means causing separation of said lids from said pans as said lids and pans advance.

6. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including pivotally connected links, each link having an elongated yieldable friction face disposed at substantially right angles to the plane of movement of said endless conveyers, a projection adjacent the lower end of each friction face and yieldable backing means for the inner run of each endless conveyer whereby lids on bake pans carried by said bake pan conveyer means may move between said endless conveyers with said friction faces in tight gripping engagement with the edges of said lids and with said projection extending beneath the edges of said lids, the inclination of said endless conveyers relative to said bake pan conveyer means causing separation of said lids from said pans as said lids and pans advance.

7. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including pivotally connected links, each link having an elongated yieldable friction face disposed at substantially right angles to the plane of movement of said endless conveyers and yieldable backing means for the inner run of each endless conveyer whereby lids on bake pans carried by said bake pan conveyer means may move between said endless conveyers with said friction faces in tight gripping engagement with the edges of said lids, the inclination of said endless conveyers relative to said bake pan conveyer means causing separation of said lids from said pans as said lids and pans advance.

8. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including elongated yieldable friction faces disposed at substantially right angles to the plane of movement of said endless conveyers, and yieldable backing means for the inner run of each endless conveyer whereby lids on bake pans carried by said bake pan conveyer means may move between said endless conveyers with said friction faces in tight gripping engagement with the edges of said lids, the inclination of said endless conveyers relative to said bake pan conveyer means causing separation of said lids from said pans as said lids and pans advance.

9. In a device of the class described conveyer means for carrying filled bake pans with lids thereon, lid removing and conveying means comprising opposed endless conveyers disposed at each side of said pan conveyer means, said endless conveyers being inclined upwardly away from said pan conveyer means, said endless conveyers including elongated yieldable friction faces disposed at substantially right angles to the plane of movement of said endless conveyers whereby lids on bake pans carried by said bake pan conveyer means may move between said endless conveyers with said friction faces in tight gripping engagement with the edges of said lids, the inclination of said endless conveyers relative to said bake pan conveyer means causing separation of said lids from said pans as said lids and pans advance.

10. In a device of the class described conveyer means for carrying filled bake pans with lids thereon, lid removing and conveying means comprising opposed conveyers disposed at each side of said pan conveyer means, said opposed conveyers being inclined upwardly away from said pan conveyer means, said opposed conveyers including yieldable friction faces disposed at substantially right angles to the plane of movement of said opposed conveyers whereby lids on bake pans carried by said bake pan conveyer means may move between said opposed conveyers with said friction faces in tight gripping engagement with the edges of said lids, the inclination of said opposed conveyers relative to said bake pan conveyer means causing separation of said lids from said pans as said lids and pans advance.

References Cited in the file of this patent

UNITED STATES PATENTS

| Number | Name | Date |
|---|---|---|
| 1,306,477 | Frey | June 10, 1919 |
| 1,949,847 | Stockdale | Mar. 6, 1934 |
| 2,144,547 | Robinson et al. | Jan. 17, 1939 |
| 2,200,116 | Maguire et al. | May 7, 1940 |
| 2,353,736 | Le Frank | July 18, 1944 |
| 2,470,253 | Lerner | May 17, 1949 |
| 2,524,656 | Eyster | Oct. 3, 1950 |